A. W. TYLER.
ORE CONCENTRATOR.
APPLICATION FILED JULY 22, 1916.
1,262,603.
Patented Apr. 9, 1918.
2 SHEETS—SHEET 1.
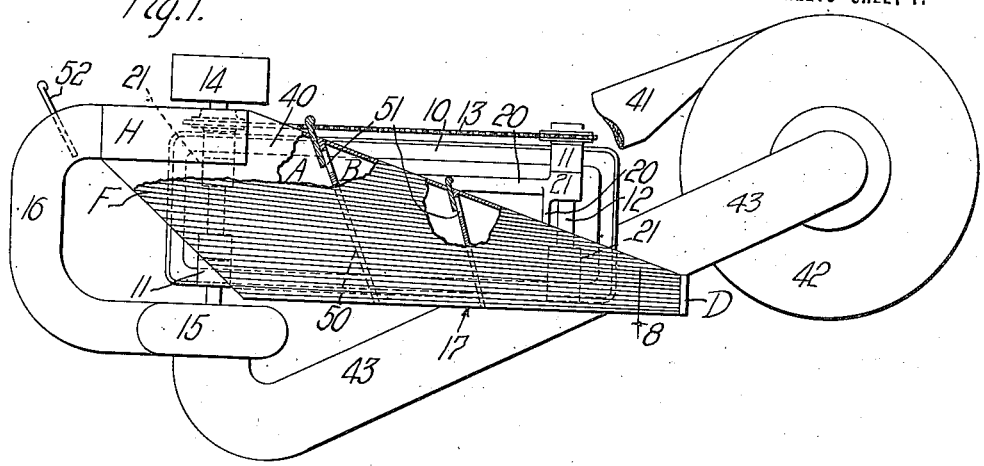
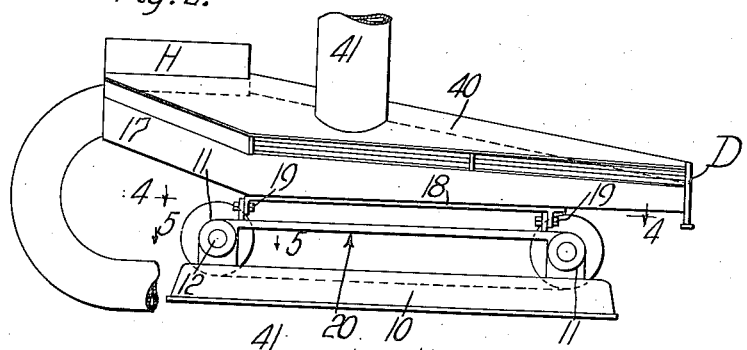
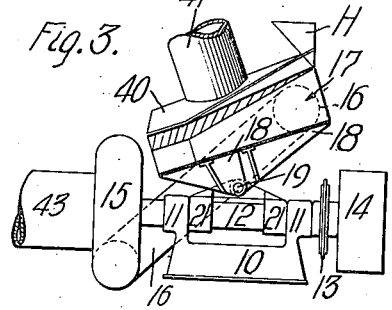
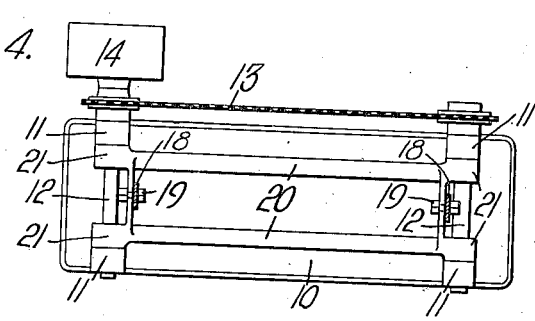
Inventor
Alva W. Tyler,
by
his Attorney.

A. W. TYLER.
ORE CONCENTRATOR.
APPLICATION FILED JULY 22, 1916.
1,262,603.
Patented Apr. 9, 1918.
2 SHEETS—SHEET 2.
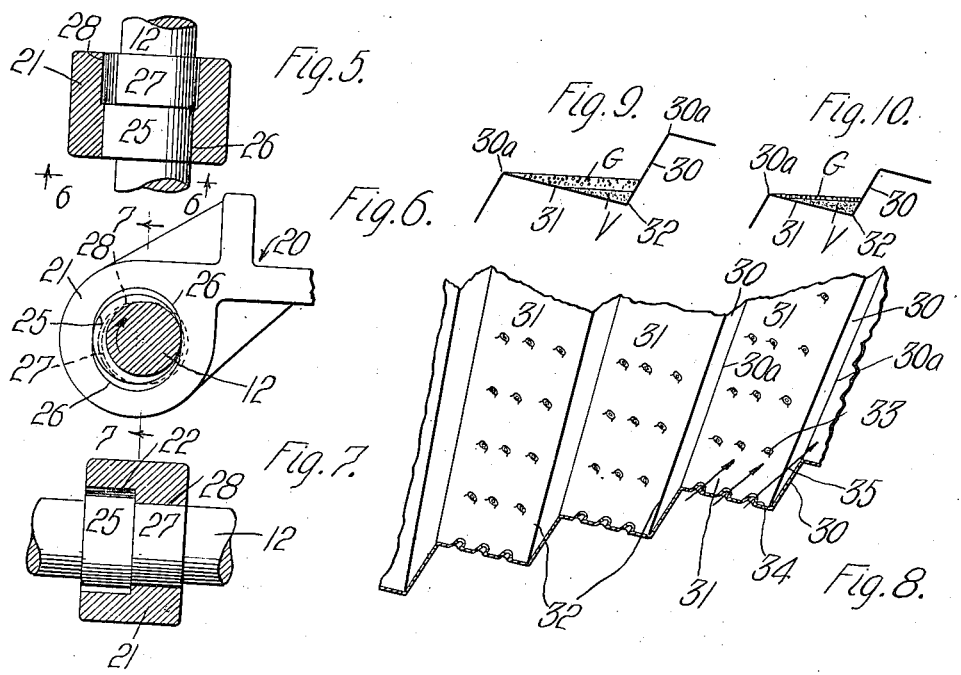
Inventor
Alva W. Tyler
by James T[...]
his Attorney.

UNITED STATES PATENT OFFICE.

ALVA W. TYLER, OF LOS ANGELES, CALIFORNIA, ASSIGNOR, BY DIRECT AND MESNE ASSIGNMENTS, TO YOUNG & TYLER, OF LOS ANGELES, CALIFORNIA, A COMPANY ORGANIZED UNDER THE LAWS OF CALIFORNIA.

ORE-CONCENTRATOR.

1,262,603.            Specification of Letters Patent.      Patented Apr. 9, 1918.

Application filed July 22, 1916. Serial No. 110,710.

*To all whom it may concern:*

Be it known that I, ALVA W. TYLER, a citizen of the United States, residing at Los Angeles, in the county of Los Angeles, State of California, have invented new and useful Improvements in Ore-Concentrators, of which the following is a specification.

This invention relates to devices for concentrating dry ores; and it is an object of this invention to provide a form of concentration table surface and mechanism for moving the table, so that dry ores placed thereon may be efficiently and quickly separated, and the values therefrom concentrated.

There are several distinctive objects and features of my invention which I explain in the following specification; and I may especially mention the formation of the riffles on the table surface and also the peculiar motion which I give my concentrating table. It has heretofore been the practice to move concentrating tables with a jerky motion; that is, with a motion relatively slow in one direction and quick in the other. This jerky motion has several disadvantages, among which is the vibration caused in the upper concentrating surface of the table. It is an object of my invention to provide a table movement which will reduce such vibration as much as possible and to provide a table surface that is structurally strong against vibration. I provide a motion which is of the same velocity in opposite directions. I provide for the progression of material along the table surface by moving the table surface slightly up and down during its horizontal movement. During the horizontal movement in one direction the table is moving upwardly; and during its horizontal movement in the opposite direction the table is moving downwardly. When the table moves downwardly the material on the table does not, comparatively speaking, move with the table; while during the upward movement of the table, the material on the table does move with the table surface.

Other objects and features of the invention are the specific formation of the riffles when considered in conjunction with their relative placement—their placement relative to the slope of the table, relative to the line of movement of the table, and relative to each other; the arrangement of air jets in the riffles in such positions and in such directions as to give an action tending to concentrate the larger particles and at the same time to save the fine values; the control of the air jets in such a manner that the force of the jets at different points of each riffle may be independently varied; and the saving of the fine dust that arises from the table and usually contains values. It is an object of this invention to provide a system and mechanism for combining gravity and air separation, to obtain a complete separation of both coarse and fine values at one operation, and thus eliminate the usual series of successive operations usually required for different grades and sizes of material.

These and other features of my invention are explained in the following specification wherein I describe a preferred form of apparatus embodying my invention.

In the accompanying drawings Figure 1 is a plan of a preferred form of apparatus embodying my invention, parts being broken away for purposes of illustration. Fig. 2 is a side elevation of the same, parts being broken away. Fig. 3 is an end elevation of the same, parts being broken away. Fig. 4 is a plan of the lower parts of the apparatus taken as indicated by line 4—4 on Fig. 2. Fig. 5 is an enlarged detail section taken as indicated by line 5—5 on Fig. 2, Fig. 6 is a view taken as indicated by line 6—6 on Fig. 5. Fig. 7 is a section taken as indicated by line 7—7 on Fig. 6. Fig. 8 is a section and perspective taken as indicated by line 8 on Fig. 1. Fig. 9 is a diagram showing the form of the riffles of the table surface at their end near the feed end of the table and indicating the action of riffles holding the heavier valuable particles; and Fig. 10 is a similar diagram illustrating the form and action of the riffles at their ends near the discharge end of the table. In the drawings I show a suitable base 10 carrying four bearings 11 in which I mount two horizontal shafts 12. These shafts are connected by a suitable chain connection 13 (preferably) so as to rotate at equal speeds; and a driving pulley 14 may be provided on one of the shafts for driving the machine. A blower 15 may be directly connected with one of the shafts 12 to blow air through the air pipe 16 into the table box 17 beneath the table surface. The table box 17 is preferably formed as shown in the various views and is mounted upon a suitable supporting frame or frames 18 which are pivoted at 19 to a horizontal frame 20. This horizontal frame 20 has four eccentric boxes each engaging a pair of eccentrics on the shafts 12. There is a pair of eccentrics for each of the eccentric boxes; and one pair of the eccentrics is shown in detail in Figs. 5, 6 and 7. One eccentric 25 has a throw equal to the distance it is desired to move the table horizontally; and this eccentric 25 is engaged by a slot 26 in the box 21, which slot is elongated vertically; so that the box partakes only of the horizontal movement of the eccentric and not of its vertical movement. The other eccentric 27 has preferably a smaller throw than that of the eccentric 25; and this eccentric 27 is confined within a horizontally lengthened slot 28; so that the box 21 partakes only of the vertical movement of eccentric 27 and not of its horizontal movement. It is not necessary to have the eccentrics 25 on both shafts, as one set on one of the shafts will amply suffice to move the table horizontally. I consequently prefer to leave the eccentrics 25 off the shaft 12 at the right in Fig. 1. Now the eccentric 27 is preferably arranged at an angle of 90° behind the eccentric 25 and rotation takes place in the direction indicated by the arrow in Fig. 6. It will be seen that during the first half revolution of the shaft, in the direction indicated, the eccentric 25 will cause the box 21 to move to the right in Fig. 6, while the eccentric 27 will, during that same period, cause the box to move upwardly; then during the next half revolution, the box will be caused to move toward the left and downwardly. The eccentrics on the two shafts 12 are arranged so as to have similar simultaneous actions on the boxes; so that the whole frame 20 is caused to move as herein described; that is, it is caused to move upwardly and toward the right and then downwardly and toward the left. The table box 17, being mounted directly on the frame 20, partakes of this peculiar movement; with the result that the material on the table is moved to the right or toward the discharge D at the small end of the table.

The table surface is preferably made of sheet metal conformed to make riffles of the particular form shown in Fig. 8. Each riffle has a steep back wall 30 and a relatively gently sloping front and bottom wall 31, the bottom of the riffle being along the line 32 between the walls 30 and 31. The angle between the walls, at the line 32, is preferably greater than a right angle. Fig. 8 shows a normal inclination of the walls of the riffles but this inclination varies with the variation in the general transverse slope of the table, by adjusting the table about the pivotal points 19. The slope of the bottom wall 31, however, is always rearward; that is, toward the back or high edge of the table, so that the wall 31 may be termed a relatively gently sloping front-and-bottom wall. The slope of this wall is opposite to the general slope of the table; and this slope causes the heavy material lying at the bottom of the riffles to work back, in a direction opposite to that in which the overlying gangue is working, against the back walls 30 of the riffles. I provide air openings through the bottom walls of the riffles by punching holes upwardly through those walls so as to form openings as shown at 33 with slight raises or protuberances 34 of the metal around them; and these openings are punched in such a direction that the air which blows out through the openings will be projected in lines not normal to the surface of the walls 31, but at a slight angle toward the back walls 30. These protuberances not only give direction to air stream but prevent material from working into the air chamber. The protuberances also allow the accumulation of a thin layer of the finer particles on the bottoms of the riffles where they are unaffected by the air jets. This direction of projection is indicated by the arrows at 35 in Fig. 4; and the jets from the openings closest to the walls 30 preferably just pass the upper edge 30ᵃ of the wall 30 without striking and disturbing any heavy material which may be rolling over that edge into the pocket formed along the lowermost line 32.

It will be noted that the upper surface formation of the table is such as to be strong against vibration in any direction; the angular positions of the walls of the riffles reinforce the surface. And, furthermore, it will be noted that the motion given the table is easy and smooth and has no quick reversals of direction. Consequently the concentrating surface is not set into vibration and the material thereon is not objectionably vibrated as is the case in many concentrators.

The riffles are not of the same size throughout their lengths, but are preferably wider, and correspondingly deeper, at the feed end F of the table than they are at the discharge D. In other words, each riffle gradually converges to smaller size as it nears the discharge end of the table. This is indicated in Figs. 1, 3 and 8. The purpose of this particular arrangement may be described as follows: At the feed end of the table the riffles, being broader and larger, facilitate the settling out and concentration of the heavier materials, as in each riffle there is a large area over which concentrating action takes place. Once the values are settled out, the riffles are narrowed to reduce the amount of gangue matter held therein. At the upper end of the table where the riffles are large, the heavy valuable material which collects in the bottom of each riffle is covered by a comparatively thick layer of lighter matter under the level of the edge 30ª. This is shown in diagram in Fig. 9, where the heavy valuable material is indicated at V and the lighter material or gangue is indicated at G. This layer of gangue G has the effect of protecting the heavier valuable material at V from being moved transversely down the table and over the riffles by the large body or mass of gangue which is constantly running transversely off the table. At the discharge end of the table, where the riffles are smaller as is indicated in diagram of Fig. 10, the heavy valuable material V occupies most of the space in the riffle below the level of the edge 30ª; all or most of the gangue G having then passed transversely over the edge 30ª. In the ideal condition the riffles would be of just that size at their lower ends to carry the heavy valuable material without carrying any gangue at all. The shape of the riffles and the disposition of the air jets therein provide alternating zones of air pressure and zones of no air pressure. In the back and lowermost part of each riffle there is a space between the back wall 30 and the rearmost row of jets, in which space there is no air action. This space extends longitudinally of each riffle, as do also the zones of air pressure. The fine valuable material which may work over the edge 30ª drops down into this "dead" space and then remains there undisturbed. From this position, due to the slope of the bottom of the riffle and the consequent crowding of this material to the back, the material cannot escape. The coarse values will ride above the fine values and will be subject to the air action; but are not affected by the air action as much as the finer particles would be. Consequently, I provide means for applying the air action to the larger particles to efficiently cause their separation and concentration, and at the same time provide means for taking the fine values more or less completely out of the air action. The importance of this is that it aids the simultaneous concentration of both fine and coarse particles; more fully referred to hereinafter.

I divide the interior of the table box into a suitable number of air compartments in which the pressure may be relatively regulated so that different air pressures may be maintained on different parts of the table surface and at different parts of each riffle. For instance, where the material first comes onto the table and where the bulk of the ore passes over the table it is desirable to have a comparatively heavy air pressure; while, on those parts of the table carrying the fine material only, it is desirable to have a lower air pressure to avoid blowing the fine material off the table. Accordingly I may divide the box interior by suitable partitions 50 into a plurality of compartments.

The pressure from pipe 16 enters the compartment A, and then, through the gated opening 51 enters the compartment B, and so on through the various compartments. By adjusting the gates at openings 51 the relative pressures in the various compartments may be varied to suit any particular conditions. A gate 52 in the pipe 16 provides for regulation of the general pressure of air in the table box.

I place a dust cover 40 over the table, and a pipe or tube 41 connects into the cover and passes to a dust collector or separator 42; a suction pipe 43 leading from the separator 42 to the blower 15. The dust arising from the materials on the table is thus collected and may be treated to separate any contained values. The machine is in this case a combined blower and exhauster creating a continuous closed circulation of the air, and the dust being taken out on the suction side of the machine.

In the operation of my concentrator, the material is fed into a feed hopper H at the upper side of the table and at the feed end of the table denoted F. The material spreads from the hopper over the table. The movement of the table and agitation of the material have an immediate tendency to settle the heavy valuable particles to the bottom where they are caught by the riffles. Being caught by the riffles they are prevented from moving transversely off the table, while the lighter gangue rolls transversely off the table and discharges along its lower edge. The heavier materials are acted upon by the peculiar movement of the table herein described, and are progressively moved toward the discharge D where they are taken off. It will be noted that the riffles are not parallel to the line of movement of the table but that they have an angular position with reference to that line of movement. This angle varies somewhat, being greater in the riffles at the upper edge of the table, due to the converging form of the riffles. However, substantially all of the riffles are arranged so that they extend slightly diagonally downwardly toward the discharge end of the table. The effect of this position is this: that the longitudinal movement of the heavier materials (caused by the peculiar table movement herein described) causes the heavier materials to be constantly crowded back against the back walls 30 of the riffles, thus counteracting any tendency of the transversely traveling gangue to carry the heavier materials transversely out of the riffles. And also, the upper riffles having more slope from end to end than the lower riffles, due to their diagonal placement on the transversely sloping table surface, the heavy material held in the riffles at the upper side of the table has a faster longitudinal movement than that held in the lower riffles. This causes a quick separation by quick movement of the concentrated valuable particles. The percentage of valuable materials in the original ore grows less as the ore passes transversely over the table; consequently, in the riffles nearer the lower edge of the table less crowding action is required, and the riffles are arranged with constantly decreasing angle of placement toward this lower edge. The quantity of material run over the table depends upon the difficulty or ease of separation and upon the percentage of recovery desired. With proper manipulation and control and proper tilting of the table, the percentage of recovery of materials is high. And if there are several different valuable heavy materials, these several materials will be more or less completely separated from each other by the same action and in the same manner that the heavy materials in general are separated from the lighter materials.

In concentrating ores of various kinds it is economical and efficient to crush the ore no finer than is necessary to release the valuable particles contained therein. However, even though the values may release at a comparatively coarse crushing, there is always a large amount of very fine material produced; and this fine material usually contains a comparatively high percentage of the values, frequently running considerably higher in values than the original ore. In many concentrating methods, and on many concentrating tables, this fine material is lost altogether, being blown from the table surface by the air jets or air pressure used. Of course, all of the material may be uniformly ground very fine; but this is relatively expensive. On the other hand, the mixed coarse and fine material may be separated by operating several machines on different grades of material. But I provide a machine in which the mixed coarse and fine material is concentrated and separated by a single operation, necessitating the crushing of the ore only to a point where the values are released. This I am enabled to do on account of the provisions hereinbefore described; the finer heavy particles settling rapidly to the bottom of the trough out of the air zones where it is not subjected to being lifted from the surface. Coarser valuable materials are, of course, subjected to the air action; and this air action is so regulated that it causes efficient concentration of the coarser particles. There is a certain small percentage of the fine material which is blown up or raised up from the surface in the form of dust, by the air action and by the general agitation of the material; and this fine dust is recovered by the dust collector hereinbefore described. The use of the dust cover and collector enables me to save the very fine metallic particles which would otherwise be lost in the dust blown off; and enables me to operate the machine in such a manner, and with such an air pressure, as to efficiently concentrate the larger particles and at the same time to save the very fine values. The air pressure required for concentrating the coarser particles is necessarily greater than that which would be required for the very fine ones; the result being that when the coarser particles are properly concentrated, the very fine particles are, to some extent, blown off. As hereinbefore stated, this very fine material sometimes contains a high percentage of values; and its recovery by means other than the action of gravity separation enables me, as herein stated, to properly concentrate the larger mass of coarser material.

Having described a preferred form of my invention, I claim:

1. In a device of the character described, a concentrating surface having riffles formed with relatively steep back walls and relatively gently sloping front-and-bottom walls, said riffles being comparatively wide at one end and narrow at the other end, there being air jet perforations in said front-and-bottom walls, said air jet perforations inclining upwardly and backwardly toward the back walls of the riffles.

2. In a device of the character described, a concentrating table having an upper concentrating surface with riffles and with perforations therethrough for upward passage of fluid under pressure, means to apply fluid under pressure to the perforations, and means to control the pressure of said fluid to vary the pressures at different parts of the concentrating surfaces and at different parts of the several riffles.

3. In a device of the character described, a concentrating table having an upper concentrating surface with riffles and with perforations in the riffles, a plurality of separate air compartments below different parts of said surface and below different parts of each riffle, and means to controllably admit air under pressure to said compartments so as to maintain therein different pressures relatively controllable.

4. In a device of the character described, a concentrating table having an upper concentrating surface with riffles formed thereon, said riffles being relatively wide at the feed end of the table and relatively narrow at the discharge end of the table and convergent toward each other at the discharge end of the table, a plurality of air compartments situated beneath different parts of the concentrating surface and beneath different parts of each riffle, said surface being perforated for upward escape of air from the compartments; and means for controllably admitting air under pressure to the several air compartments so as to maintain in them different pressures relatively controllable.

5. In a device of the character described, a concentrating table having an upper concentrating surface with longitudinal riffles formed thereon, said surface being transversely tilted from side to side, means to feed material onto the table at one end at the higher side, a discharge at the other end of the table, said riffles being relatively wide at the feed end of the table and relatively narrow at the discharge end of the table and convergent toward each other from the feed end to the discharge end, each riffle having a relatively steep back wall on its side toward the high side of the concentrating surface and having a relatively gently sloping front-and-bottom wall on its side toward the lower side of the concentrating surface, and means to move the table longitudinally back and forth on a line of motion making a greater angle with the upper riffles than with the lower riffles.

6. In a device of the character described, a concentrating table having an upper concentrating surface with longitudinal riffles formed thereon, said surface being transversely tilted from side to side, means to feed material onto the table at one end at the higher side, a discharge at the other end of the table, said riffles being relatively wide at the feed end of the table and relatively narrow at the discharge end of the table and convergent toward each other from the feed end to the discharge end, each riffle having a relatively steep back wall on its side toward the high side of the concentrating surface and having a relatively gently sloping front-and-bottom wall on its side toward the lower side of the concentrating surface, and means to move the table longitudinally back and forth on a line of motion substantially parallel with the lowermost riffles.

7. In a device of the character described, a concentrating surface having riffles formed with relatively steep back walls and relatively gently sloping front-and-bottom walls, and air jet perforations in said front-and-bottom walls directed upwardly and backwardly at a substantial definite angle toward the back walls of the riffles.

8. In a device of the character described, a concentrating surface having riffles formed with relatively steep back walls and relatively gently sloping front-and-bottom walls, and air jet perforations in said front-and-bottom walls directed upwardly and backwardly, with reference to lines normal to the front-and-bottom walls, toward the back walls of the riffles.

9. In a device of the character described, a concentrating surface having riffles formed with relatively steep back walls and relatively gently sloping front-and-bottom walls, and upward protuberances from the front-and-bottom walls with air jet perforations inclined backwardly toward the back walls of the riffles.

10. In a device of the character described, a concentrating surface having riffles formed with relatively steep back walls and relatively gently sloping front-and-bottom walls, and air jet perforations in said front-and-bottom walls directed upwardly and backwardly toward the back walls of the riffles, the air jet perforations being spaced from the back walls of the riffles so as to leave longitudinal spaces along the back edges of the front-and-bottom walls unaffected by the air jets.

11. In a device of the character described, a concentrating surface having riffles formed with relatively steep back walls and relatively gently sloping front-and-bottom walls, and air jet perforations in said front-and-bottom walls spaced from the back walls so as to leave longitudinal spaces along the back edges of the front-and-bottom walls unaffected by the air jets.

12. In a device of the character described, a sloping concentrating surface, means to cause movement of material over the surface, and protuberances on the concentrating surface each having and surrounding an air jet perforation through the surface, said protuberances and perforations inclining back in a direction toward the high side of the concentrating surface.

13. In a device of the character described, a concentrating surface sloping from side to side, longitudinal riffles on the surface, said riffles having relatively steep back walls on their sides toward the high side of the surface and having relatively gently sloping front-and-bottom walls on their sides toward the low side, said walls making an angle greater than a right angle with each other, and protuberances in the front-and-bottom walls with air jet perforations directed backwardly and upwardly toward the back walls of the riffles and toward the high side of the surface and making an angle less than a right angle with the front-and-bottom walls.

14. In a device of the character described, a concentrating surface sloping from back side to front side, and longitudinal riffles on the concentrating surface having relatively steep back walls and relatively gently sloping front-and-bottom walls sloping oppositely to the general side to side slope of the concentrating surface, and the front-and-bottom walls having air jet perforations spaced from the back walls so as to leave a space along the back edges of the front-and-bottom walls unaffected by the air jets.

15. In a device of the character described, a concentrating surface sloping from back side to front side, and longitudinal riffles on the concentrating surface having relatively steep back walls and relatively gently sloping front-and-bottom walls sloping oppositely to the general side to side slope of the concentrating surface, and the front-and-bottom walls having air jet perforations spaced from the back walls so as to leave a space along the back edges of the front-and-bottom walls unaffected by the air jets, and said perforations being inclined so as to direct the rearmost air jets of one riffle substantially just in front of the forward edge of the riffle next above.

16. In a device of the character described, a concentrating surface sloping from back side to front side, and longitudinal riffles on the concentrating surface having relatively steep back walls and relatively gently sloping front-and-bottom walls sloping oppositely to the general side to side slope of the concentrating surface, said riffles being larger at one end that at the other and converging toward each other at the last mentioned end.

17. In a device of the character described, a concentrating surface sloping from back side to front side, and longitudinal riffles on the concentrating surface having relatively steep back walls and relatively gently sloping front-and-bottom walls sloping oppositely on the general side to side slope of the concentrating surface, and the front-and-bottom walls having air jet perforations spaced from the back walls so as to leave a space along the back edges of the front-and-bottom walls unaffected by the air jets, and said perforations being inclined so as to direct the rearmost air jets of one riffle substantially just in front of the forward edge of the riffle next above, said riffles being larger at one end than at the other and converging toward each other at the last mentioned end.

18. In a device of the character described, a concentrating surface sloping from back side to front side and comprising sheet metal formed into a plurality of substantially parallel riffles each with a relatively steep back wall and a relatively gently sloping front-and-bottom wall, and protuberances with air jet perforations punched from below through the front-and-bottom walls.

19. In a device of the character described, a concentrating surface sloping from back side to front side and comprising sheet metal formed into a plurality of substantially parallel riffles each with a relatively steep back wall and a relatively gently sloping front-and-bottom wall, and protuberances with air jet perforations punched from below through the front-and-bottom walls and inclining toward the back walls.

20. In a device of the character described, a concentrating table with a concentrating surface having air jet perforations for direction of air jets upwardly through material on the surface, air blower means feeding air to the perforations, a dust cover for the table, the space between the cover and table surface being accessible to atmosphere, connection between the intake of the air blower means and the dust cover for applying suction to the dust cover to draw off the fine material raised by the air, and a dust collector in said connection on the suction side of the blower between the blower and the dust cover.

21. In a device of the character described, a concentrating table with a concentrating surface having air jet perforations for direction of air jets upwardly through material on the surface, air blower means feeding air to the perforations, a dust cover for the table, the space between the cover and table surface being accessible to atmosphere, and connection between the intake of the air blower means and the dust cover for applying suction to the dust cover to draw off the fine material raised by the air, said connection including a dust separator on the suction side of the air blower between the blower and the dust cover.

22. In a device of the character described, a concentrating surface having a slope from back side to front side, longitudinal riffles formed on said surface, said riffles having relatively steep back walls and relatively gently sloping front-and-bottom walls sloping back toward the back high side of the surface, the front and bottom walls having air jet perforations spaced from the back walls so as to leave spaces along the back edges of the front-and-bottom walls unaffected by the air jets, means to supply air to the air jets, and means to draw off the fine dust raised by the air jets.

23. In a device of the character described, a concentrating surface having a slope from back side to front side, longitudinal riffles formed on said surface, said riffles having relatively steep back walls and relatively gently sloping front-and-bottom walls, sloping back toward the back high side of the surface, the front and bottom walls having air jet perforations spaced from the back walls so as to leave spaces along the back edges of the front-and-bottom walls unaffected by the air jets, means to supply air to the jets, and means to draw off the fine dust raised by the air jets, said two last mentioned means embodying a blower for blowing air to the air jet perforations, a dust cover for the concentrating surface, and means connecting the suction of the blower to the dust cover.

24. In a device of the character described, a concentrating surface with riffles thereon converging toward each other and individually contracting toward one end of the surface, and upward protuberances in the bottom of each riffle, each protuberance having and completely surrounding an air jet perforation.

25. In a device of the character described, a transversely sloping concentrating surface having longitudinal riffles thereon, said riffles having front-and-bottom walls sloping back transversely toward the high side of the surface, and having air jet perforations through said front-and-bottom walls directed upwardly and backwardly, with reference to lines normal to the front-and-bottom walls, toward the high side of the surface.

26. In a device of the character described, a concentrating surface with riffles and with apertures along the riffles for passage of fluid pressure, the table having a plurality of separate compartments below said surface divided by walls extending transversely of the riffles, and means to controllably admit fluid pressure to the several compartments to maintain different pressures therein.

27. In a device of the character described, a concentrating surface sloping from back side to front side, and longitudinal riffles on the concentrated surface having each a back wall and a gently sloping front and bottom wall sloping oppositely to the general side to side slope of the concentrating surface, said riffles individually contracting and collectively converging toward one end of the surface.

In witness that I claim the foregoing I have hereunto subscribed my name this 15th day of July, 1916.

ALVA W. TYLER.

Witness:
    ELWOOD H. BARKELEW.